(12) United States Patent
Ebihara

(10) Patent No.: US 8,629,923 B2
(45) Date of Patent: Jan. 14, 2014

(54) SOLID-STATE IMAGING ELEMENT AND CAMERA SYSTEM THAT DETERMINE IN WHICH HORIZONTAL READ PERIOD A DUMMY PIXEL SECTION IS TO BE SHUTTERED

(75) Inventor: Hiroaki Ebihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 344 days.

(21) Appl. No.: 12/923,541

(22) Filed: Sep. 28, 2010

(65) Prior Publication Data

US 2011/0102622 A1 May 5, 2011

(30) Foreign Application Priority Data

Nov. 2, 2009 (JP) ................................ 2009-252443

(51) Int. Cl.
*H04N 9/64* (2006.01)
(52) U.S. Cl.
USPC ........................................ 348/245; 348/222.1
(58) Field of Classification Search
USPC .................................................. 348/294, 245
See application file for complete search history.

(56) References Cited

U.S. PATENT DOCUMENTS 7,852,386 B2 * 12/2010 Aoki .............................. 348/245
8,026,961 B2 * 9/2011 Takenaka et al. ............. 348/241
8,203,634 B2 * 6/2012 Mabuchi ....................... 348/294
2005/0206762 A1 9/2005 Funakoshi
2008/0055439 A1 * 3/2008 Mabuchi ....................... 348/296
2008/0284876 A1 11/2008 Makino
2012/0236188 A1 * 9/2012 Mabuchi ....................... 348/296

FOREIGN PATENT DOCUMENTS

| JP | 2001-008109 | | 1/2001 |
|---|---|---|---|
| JP | 2005-269098 | | 9/2005 |
| JP | 2005269098 A | * | 9/2005 |
| JP | 2008-288903 | | 11/2008 |
| JP | 2008-288904 A | | 11/2008 |

OTHER PUBLICATIONS

Japanese Office Action issued May 31, 2013 for corresponding Japanese Application No. 2009-252443.

* cited by examiner

*Primary Examiner* — Gary C Vieaux
(74) *Attorney, Agent, or Firm* — Rader, Fishman & Grauer PLLC

(57) ABSTRACT

A solid-state imaging element includes: a pixel section having a plurality of pixels arranged in a matrix form, each of the pixels converting an optical signal into an electric signal and storing the electric signal according to exposure time; a dummy pixel section having dummy pixels arranged in a matrix form; and pixel drive sections adapted to control the pixel operations in such a manner as to operate an electronic shutter on and read the pixel section and dummy pixel section, wherein when an electronic rolling shutter is operated in which the pixels are shuttered row by row, the pixel drive sections judge whether the current and next frames are shuttered concurrently and in parallel so as to determine in which horizontal read period the dummy pixel section is to be shuttered.

9 Claims, 9 Drawing Sheets

RELATED ART

SOLID-STATE IMAGING ELEMENT AND CAMERA SYSTEM THAT DETERMINE IN WHICH HORIZONTAL READ PERIOD A DUMMY PIXEL SECTION IS TO BE SHUTTERED

BACKGROUND OF THE INVENTION

1. Field of the Invention

The present invention relates to a solid-state imaging element and camera system for performing shuttering based on rolling shutter.

2. Description of the Related Art

Global shutter and rolling shutter (focal plane shutter) are known as types of electronic shutter for use in image sensors having photoelectric conversion elements arranged in a matrix form.

Global shutter is a type of electronic shutter that operates on all the pixels at the same time, whereas rolling shutter is a type of electronic shutter that operates on the pixels row by row.

In many cases, the pixels are read row by row with both global shutter and rolling shutter. With rolling shutter, the row on which an electronic rolling shutter operates and that which is read are shifted over time.

FIG. 1 is a diagram illustrating, for convenience, shuttering and reading in rolling shutter.

In FIG. 1, the horizontal axis represents the time, and the vertical axis the addresses of the read and shuttered rows. The unit for the horizontal axis is the horizontal read period (H) that is the read time for a single row.

In the example shown in FIG. 1, the storage time is denoted by Tint. The times at which the same address is accessed differ by time Tint between the read row and shuttered row.

For the shuttered row and read row, Ln rows are shifted from address LS to address LE every horizontal read period (1H), selecting one row after another.

In this case, the shuttering ends by time Tint earlier than the reading.

If the shuttering ends earlier than the reading as described above, the reading and shuttering are conducted at the same time in some rows, and only the reading is conducted in some other rows depending on the addresses.

In the example shown in FIG. 1, the shuttering and reading are conducted at the same time during period t1. However, only the reading is conducted during period t2.

Thus, it is known that long and narrow horizontal noise called a shutter level difference or FIBAR (Fixed Integration BAR) occurs if the number of times the shutter is operated changes while the reading is in progress.

This is attributable to the change in read output value caused by the difference in power load between when the reading and shuttering are conducted at the same time and when only the reading is conducted.

A solution to the above problem is disclosed in Japanese Patent Laid-Open No. 2001-8109 (hereinafter referred to as Patent Document 1) which maintains the power load constant by shuttering dummy rows.

This method is designed to shutter dummy rows after the shuttering of addresses LS to LE ends, thus maintaining the power load constant in periods t1 and t2 during which the reading is conducted.

The method described in Patent Document 1 is effective when the storage time is always constant between consecutive frames.

However, if the storage time is different between frames, the number of times the shutter is operated together with reading changes from one row to another, resulting in a shutter level difference.

In order to solve this problem, Japanese Patent Laid-Open No. 2005-269098 (hereinafter referred to as Patent Document 2) discloses another method. This method maintains constant the number of times the shutter is operated by providing as many dummy pixels as or more dummy pixels than the number of times the shutter is operated for two frames and thereby performing shuttering for two frames at all times.

FIG. 2 is a diagram illustrating an example of shuttering and reading when shuttering for two frames is conducted at all times.

In this case, shuttering for two frames is conducted at all times by providing dummy shutters DST1 and DST2.

CMOS (Complementary Metal Oxide Semiconductor) image sensors (CISs) are characterized in that they allow read addresses to be set with relatively less restraint than CCD (Charge Coupled Device) image sensors.

For example, in addition to a function to read all the pixels, those sensors widely used today incorporate other features, including an "addition" function adapted to read a plurality of pixel signals at the same time and a "skipping" function adapted to read pixels intermittently by skipping some rows or columns.

Image sensors are known to suffer from a phenomenon called "blooming." Blooming is a change in signal level caused by signal charge overflow from a saturated photodiode (hereinafter PD) to an adjacent PD.

When a rolling shutter is used in particular, blooming occurs during "skipping" if the charge stored in the unread pixels is not discarded as appropriate, thus resulting in degraded image quality.

In contrast, a method has been proposed to suppress blooming (refer to Japanese Patent Laid-Open No. 2008-193618). This method activates a shutter to discard the charge from the unread pixels.

When a shutter is operated to prevent blooming during "skipping," or when "addition" is performed, a plurality of rows are selected at the same time.

FIG. 3 is a diagram illustrating an example of read and shuttered row addresses in which two rows are "added together" and half the rows are "skipped."

In FIG. 3, the unit for the horizontal axis is the horizontal read period (H) that is the read time for a single row.

In FIG. 3, the row addresses "n+9" and "n+11" are selected at the same time, added together and read at time t5.

The row addresses "n+17" and "n+19" are shuttered for the frame being read. The row addresses "n" and "n+2" are shuttered for the next frame. The row addresses "n+21," "n+23," "n+4" and "n+6" are shuttered for anti-blooming purpose.

SUMMARY OF THE INVENTION

In a CMOS image sensor adapted to perform "addition" and "skipping" as described above, the number of shuttered rows per frame is large.

At time t5 in FIG. 1, for example, eight rows are shuttered. The number of times the shutter is operated increases with more pixels to be added together or with a larger percentage of pixels to be skipped.

Therefore, as described in Patent Document 2, if as many dummy pixels are provided as for two frames of shuttered rows, this leads to a large number of dummy pixels, thereby resulting in higher cost and higher power consumption.

It is desirable to provide a solid-state imaging element and camera system that contribute to significantly reduced number of times a dummy shutter is operated which is used to suppress image noise caused by a shutter level difference during a frame period.

A solid-state imaging element according to a first embodiment of the present invention includes a pixel section, dummy pixel section and pixel drive sections. The pixel section has a plurality of pixels arranged in a matrix form. Each of the pixels converts an optical signal into an electric signal and stores the electric signal according to exposure time. The dummy pixel section has dummy pixels arranged in a matrix form. The pixel drive sections control the pixel operations in such a manner as to perform electronic shuttering and reading of the pixel section and dummy pixel section. When an electronic rolling shutter is operated in which the pixels are shuttered row by row, the pixel drive sections judge whether the current and next frames are shuttered concurrently and in parallel, thus determining in which horizontal read period the dummy pixel section is to be shuttered.

A camera system according to a second embodiment of the present invention includes a solid-state imaging element, optics and signal processor. The optics forms a subject image on the solid-state imaging element. The signal processor processes an image signal output from the solid-state imaging element. The solid-state imaging element includes a pixel section, dummy pixel section and pixel drive sections. The pixel section has a plurality of pixels arranged in a matrix form. Each of the pixels converts an optical signal into an electric signal and stores the electric signal according to exposure time. The dummy pixel section has dummy pixels arranged in a matrix form. The pixel drive sections control the pixel operations in such a manner as to operate an electronic shutter on and read the pixel section and dummy pixel section. When an electronic rolling shutter is operated in which the pixels are shuttered row by row, the pixel drive sections judge whether the current and next frames are shuttered concurrently and in parallel, thus determining in which horizontal read period the dummy pixel section is to be shuttered.

The present invention contributes to significantly reduced number of times a dummy shutter is operated which is used to suppress image noise caused by a shutter level difference during a frame period.

DETAILED DESCRIPTION OF THE PREFERRED EMBODIMENTS

A description will be given below of the preferred embodiments of the present invention with reference to the accompanying drawings.

It should be noted that the description will be given in the following order:
1. First embodiment (configuration example of the CMOS image sensor (solid-state imaging element))
2. Second embodiment (configuration example of the camera system)

1. First Embodiment

Figure 1:
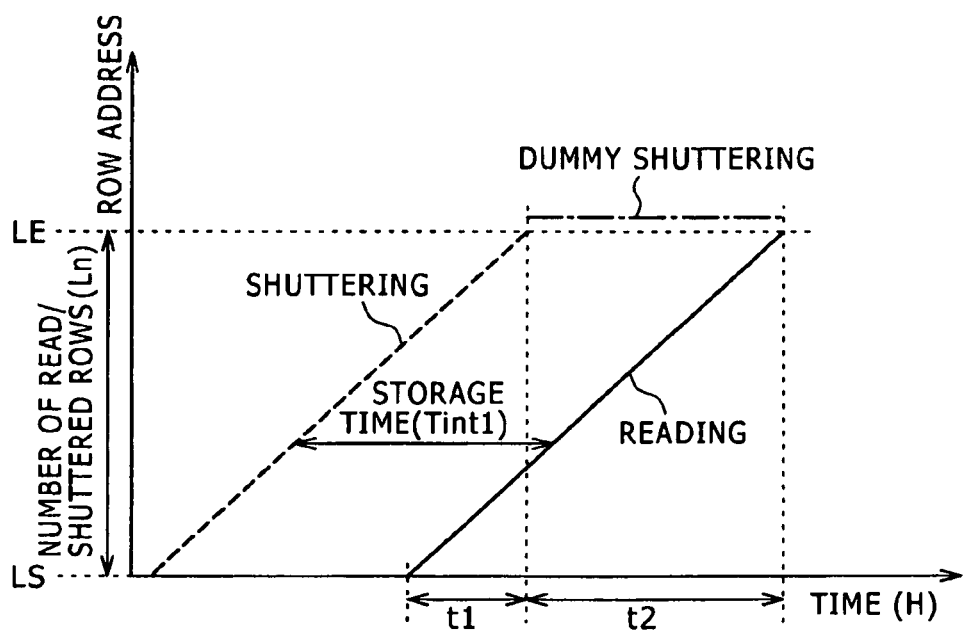
FIG. 1 is a diagram illustrating, for convenience, shuttering and reading in rolling shutter.
Figure 2:
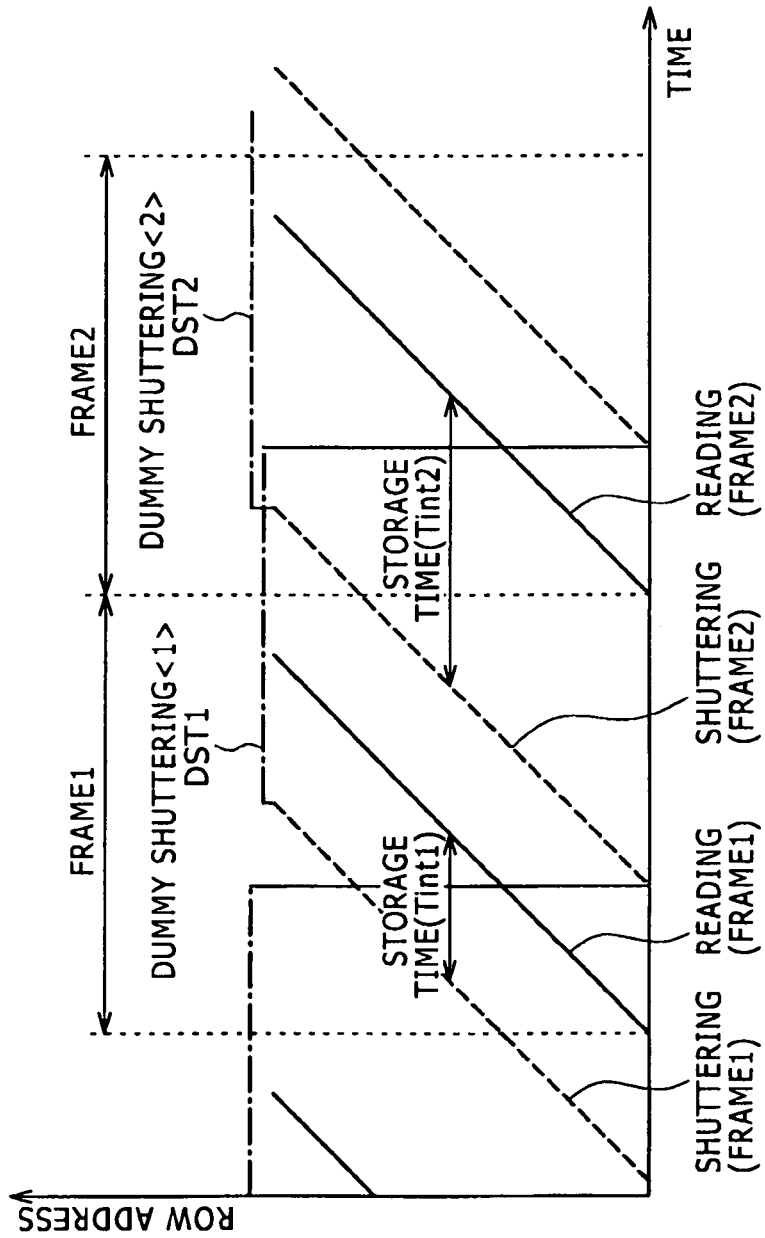
FIG. 2 is a diagram illustrating an example of shuttering and reading when shuttering for two frames is conducted at all times.
Figure 3:
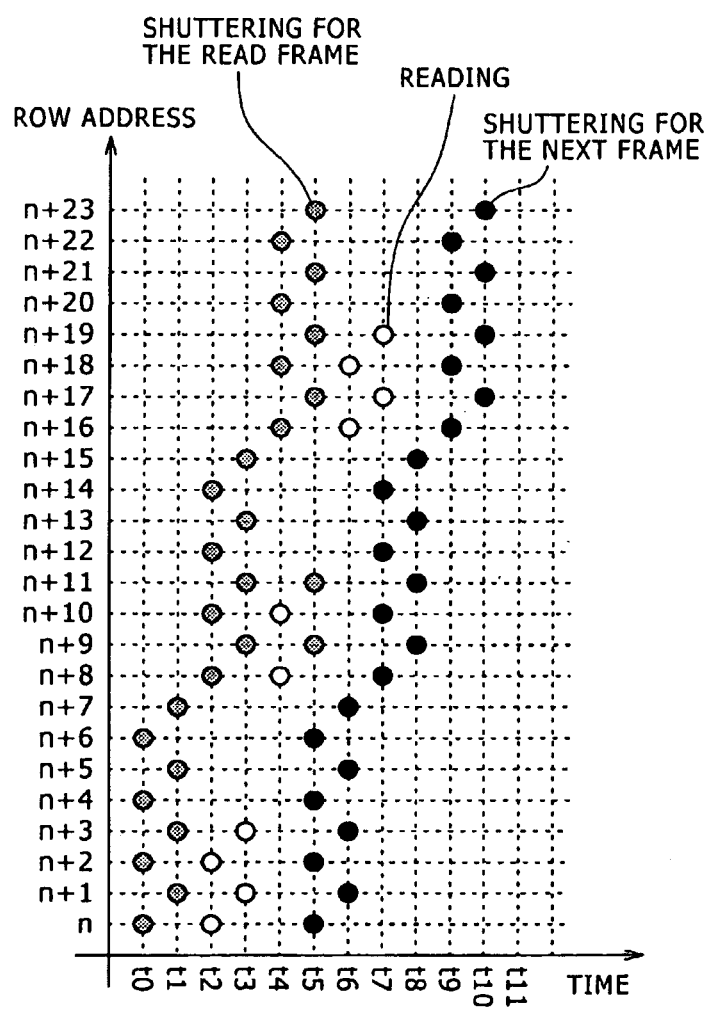
FIG. 3 is a diagram illustrating an example of read and shuttered row addresses in which two rows are "added together" and half the rows are "skipped"
Figure 4:
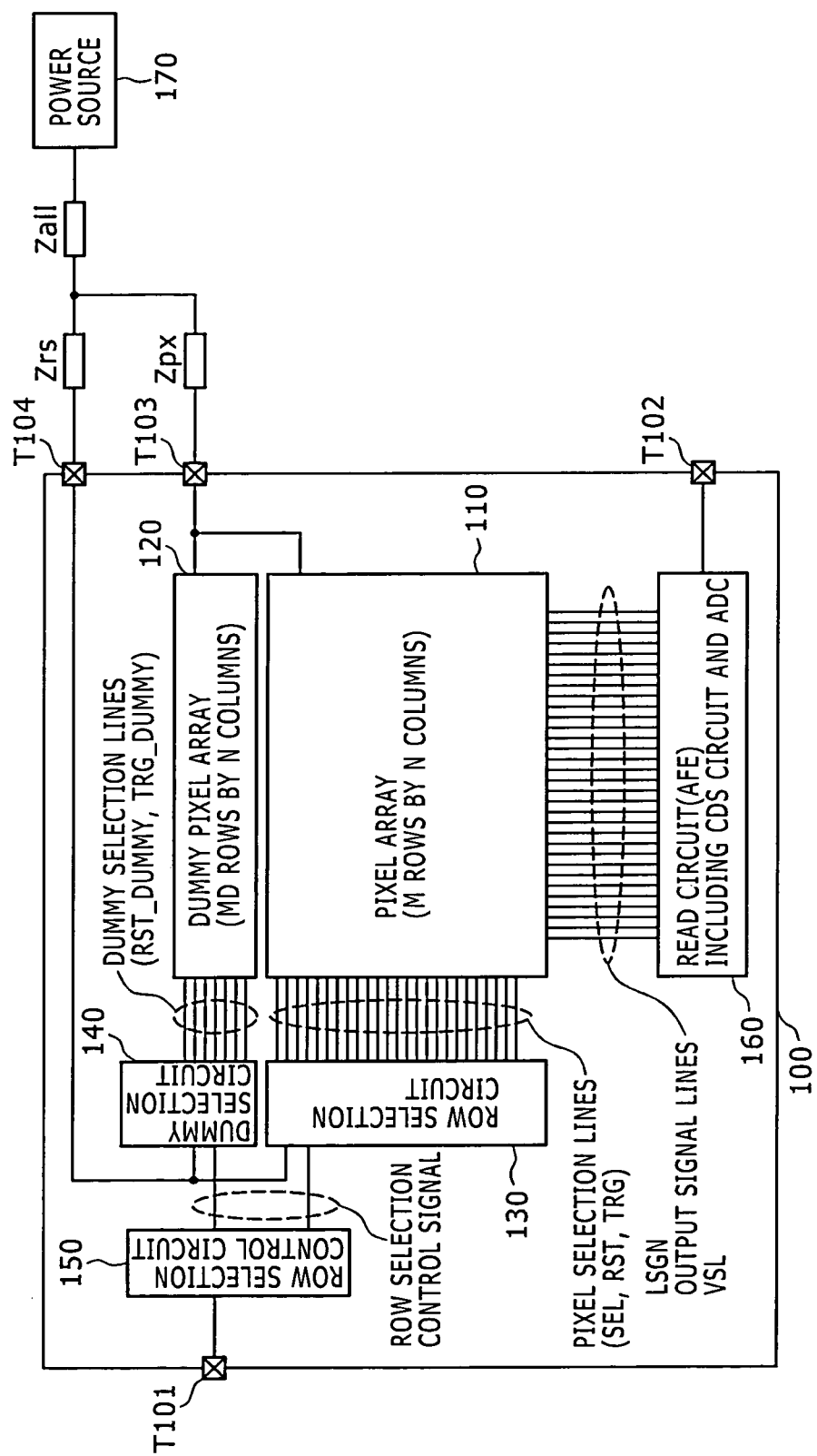
FIG. 4 is a diagram illustrating a configuration example of a CMOS image sensor (solid-state imaging element) according to a first embodiment of the present invention.

FIG. 4 is a diagram illustrating a configuration example of a CMOS image sensor (solid-state imaging element) according to an embodiment of the present invention.

A CMOS image sensor 100 includes a pixel array section 110, dummy pixel array section 120, row selection circuit 130, dummy selection circuit 140, row selection control circuit 150 and read circuit (AFE) 160.

The row selection circuit 130, dummy selection circuit 140 and row selection control circuit 150 make up pixel drive sections.

The CMOS image sensor 100 further includes an input terminal T101 for an operation mode selection signal MDS, a data output terminal 102, pixel power terminal T103 and row selection circuit power terminal T104.

The pixel array section 110, dummy pixel array section 120, row selection circuit 130 and dummy selection circuit 140 of the CMOS image sensor 100 are supplied with power from an external power source 170 via the pixel power terminal T103 and row selection circuit power terminal T104.

Ideally, it is preferred that there should be no wiring impedance between the power source 170 and each of the blocks making up the CMOS image sensor 100.

In reality, however, finite impedances Zall, Zpx and Zrs exist. Therefore, it is likely that noise may be transmitted to the pixel power source when the row selection circuit 130 is activated.

In the configuration example shown in FIG. 4, power is supplied to the pixels and the row selection circuit separately via the different PADs (terminals) 103 and 104. However, the two power sources may be connected together in the CMOS image sensor 100 so that power can be supplied externally via a single PAD.

The pixel array section 110 has a plurality of pixels arranged in two dimensional matrix of M rows by N columns.

Figure 5:
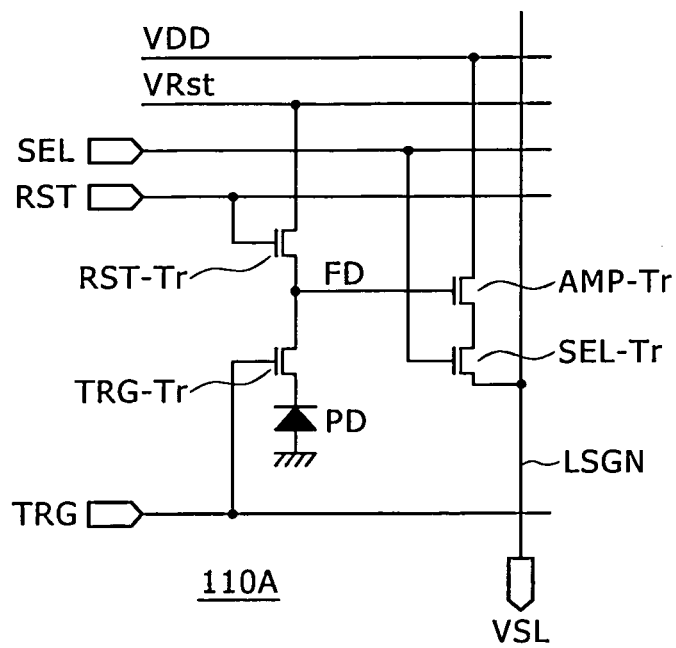
FIG. 5 is a diagram illustrating an example of a pixel circuit according to the present embodiment.

FIG. 5 is a diagram illustrating an example of a pixel circuit according to the present embodiment.

A pixel circuit 110A includes, for example, a photoelectric conversion element (hereinafter maybe simply referred to as a PD) which includes a photodiode (PD).

The pixel circuit 110A also includes, for each PD, a transfer transistor TRG-Tr, reset transistor RST-Tr, amplifying transistor AMP-Tr and selection transistor SEL-Tr.

The photoelectric conversion element PD generates and stores a signal charge (electron in this case) whose level is commensurate with the amount of incident light.

A description will be given below of a case in which the signal charge is electrons, and the transistors are n-type transistors. However, the signal charge may be holes, and the transistors may be p-type transistors.

The present invention is also effective when each of the transistors is shared among a plurality of photoelectric conversion elements and when each pixel includes three transistors with no selection transistor.

The transfer transistor TRG-Tr is connected between the photoelectric conversion element PD and an FD (Floating Diffusion) and controlled via a control line TRG.

The same transistor TRG-Tr is selected to conduct when the control line TRG is at high level, transferring electrons generated by photoelectric conversion by the photoelectric conversion element PD to the FD.

The reset transistor RST-Tr is connected between a power line VRst and the FD and controlled via a control line RST.

The same transistor RST-Tr is selected to conduct when the control line RST is at high level, resetting the FD to the potential of the power line VRst.

The amplifying transistor AMP-Tr and selection transistor SEL-Tr are connected between a power line VDD and vertical signal line LSGN.

The amplifying transistor AMP-Tr has its gate connected to the FD. The selection transistor SEL-Tr is controlled via a control line SEL.

The selection transistor SEL-Tr is selected to conduct when the control signal SEL is at high level. This allows for the amplifying transistor AMP-Tr to output a signal VSL, commensurate with the FD potential, to the vertical signal line LSGN.

The pixel array section 110 has the pixel circuits 110A arranged in M rows by N columns. Therefore, there are the M control lines SEL, M control lines RST and M control lines TRG. On the other hand, there are the N vertical signal lines LSGN for the signal VSL.

The dummy pixel array section 120 has dummy pixels arranged in MD rows by N columns.

Figure 6:
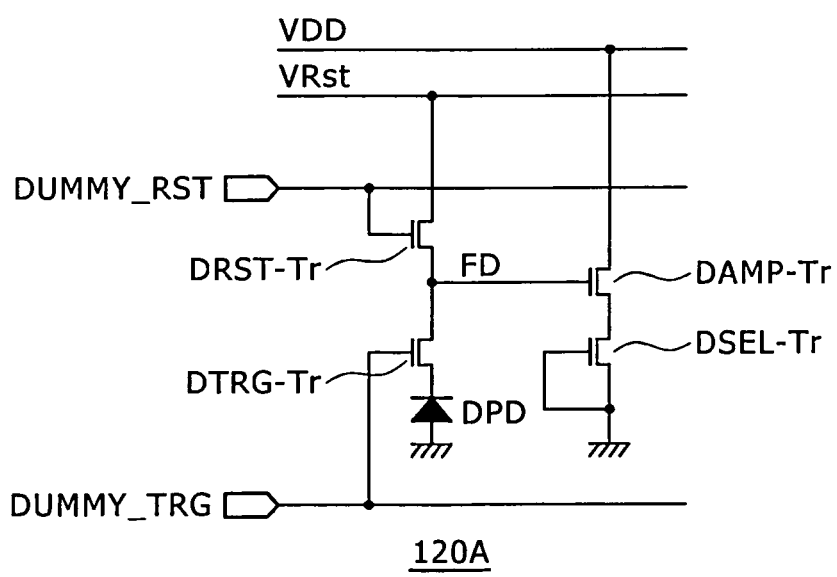
FIG. 6 is a diagram illustrating an example of a dummy pixel circuit according to the present embodiment.

FIG. 6 is a diagram illustrating an example of a dummy pixel circuit according to the present embodiment.

A dummy pixel circuit 120A includes at least a dummy transfer transistor DTRG-Tr and dummy reset transistor DRST-Tr.

On the other hand, it is preferred that the dummy pixel circuit 120A should further include a dummy photoelectric conversion element DPD, dummy selection transistor DSEL-Tr and dummy amplifying transistor DAMP-Tr.

The dummy transfer transistor DTRG-Tr is connected between the dummy photoelectric conversion element DPD and FD and controlled via a control line DUMMY-TRG.

The same transistor DTRG-Tr is selected to conduct when the control line DUMMY-TRG is at high level, transferring electrons generated by photoelectric conversion by the dummy photoelectric conversion element DPD to the FD.

The dummy reset transistor DRST-Tr is connected between the power line VRst and FD and controlled via a control line DUMMY-RST.

The same transistor DRST-Tr is selected to conduct when the control line DUMMY-RST is at high level, resetting the FD to the potential of the power line VRst.

The above configuration ensures that the control lines DUMMY-RST and RST are comparable to each other in load (resistance and capacitance), and that the control lines DUMMY-TRG and TRG are comparable to each other in load.

So long as the control lines DUMMY-RST and RST are comparable to each other in load, and the control lines DUMMY-TRG and TRG are comparable to each other in load, the dummy photoelectric conversion element DPD, dummy selection transistor DSEL-Tr and dummy amplifying transistor DAMP-Tr may be removed.

The row selection circuit 130 selects the pixels of the pixel array section 110 according to a row selection control signal SCTL from the row selection control circuit 150.

The row selection circuit 130 is capable of selecting a rolling shutter or global shutter as exposure type according to the shutter mode switching signal to control the pixel driving. A rolling shutter exposes one row of pixels at a time. A global shutter exposes all the pixels at the same time.

The dummy selection circuit 140 selects the dummy pixels of the dummy pixel array section 120 according to the row selection control signal SCTL from the row selection control circuit 150.

The row selection control circuit 150 selects one of the rows according to an operation mode selection signal MDS which is an externally supplied control signal.

When an electronic rolling shutter is used, the same circuit 150 determines the maximum number of rows to be shuttered in a frame to decide on the number of rows of dummy pixels to be shuttered.

When the shuttering for the frame being read and that for the next frame are conducted at the same time, the row selection control circuit 150 controls the shuttering of the dummy pixels so that as many rows as for two frames are shuttered at all times during the read period in a frame.

When the shuttering for the frame being read and that for the next frame are not conducted at the same time, the same circuit 150 controls the shuttering of the dummy pixels so that as many rows as for one frame are shuttered at all times during the read period in a frame.

It should be noted that as many dummy shutters are provided as the number of rows shuttered in a frame in the present embodiment.

The read circuit 160 performs given processing on the signal VSL output via the vertical signal line LSGN from each of the pixel circuits 110A in the row selected by the row selection circuit 130. Then, the same circuit 160 temporarily stores the processed pixel signal.

The read circuit 160 may include a sample/hold circuit adapted to sample and hold a signal output via the vertical signal line LSGN.

Alternatively, the read circuit 160 may include a sample/hold circuit and be capable of removing, through CDS (Correlational Double Sampling), fixed pattern noise specific to the pixels such as reset noise and variation in amplifying transistor threshold.

Still alternatively, the read circuit 160 may be capable of analog/digital (AD) conversion to produce a digital signal.

Figure 7:
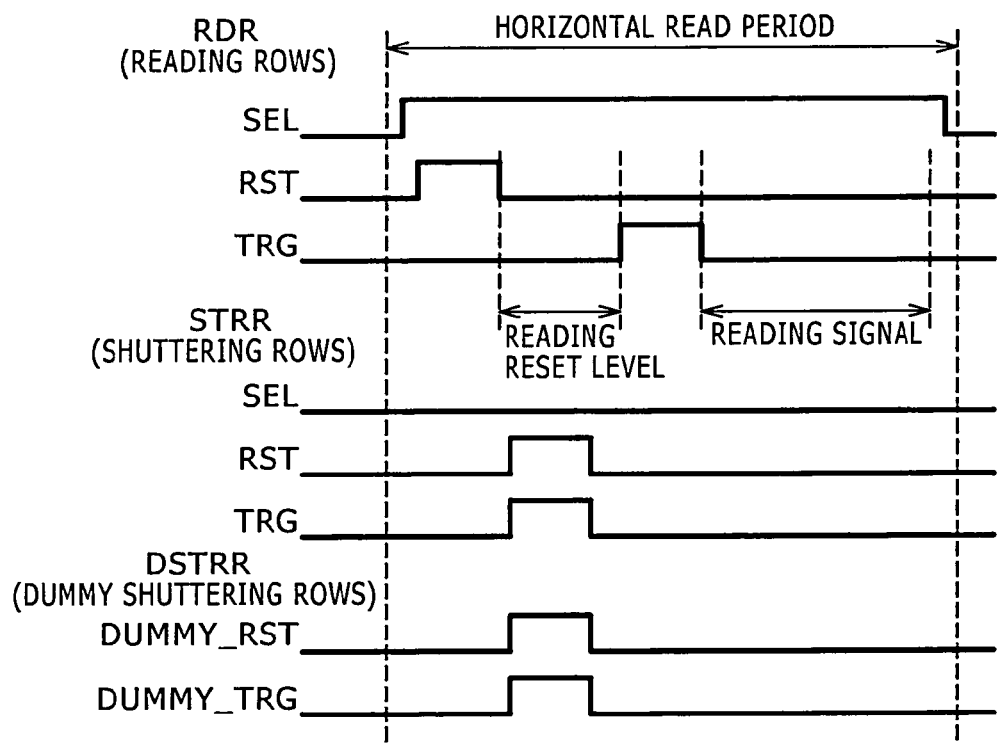
FIG. 7 is a timing diagram of the CMOS image sensor according to the present embodiment.

FIG. 7 is a timing diagram of the CMOS image sensor according to the present embodiment configured as described above.

FIG. 7 shows one horizontal read period (1H period).

For a read row RDR, the control line SEL is pulled up to high level, allowing the signal VSL to be output to the vertical signal line LSGN. Next, the control line RST is pulled up to high level, resetting the FD to the potential of the power line VRst.

Then, the control line RST is pulled down to low level, reading the reset level.

Then, the control line TRG is pulled up to high level, transferring the charge, generated by photoelectric conversion by the photoelectric conversion element PD, to the FD. After the transfer, the control line TRG is pulled down to low level, reading the signal VSL.

For a shuttered row STRR, the control lines RST and TRG are pulled up to high level at the same time at a given time during a horizontal read period, resetting the photoelectric conversion element PD to the potential of the power line VRst.

For a dummy-shuttered row DSTRR, on the other hand, the dummy control line DUMMY-RST is pulled up to high level at the same time as the control line RST for the shuttered row STRR, and the dummy control line DUMMY-TRG is pulled up to high level at the same time as the control line TRG.

This maintains the power load constant even in the event of a variation in the number of shuttered rows) in a frame FRM, thus preventing shutter level difference.

Figure 8:
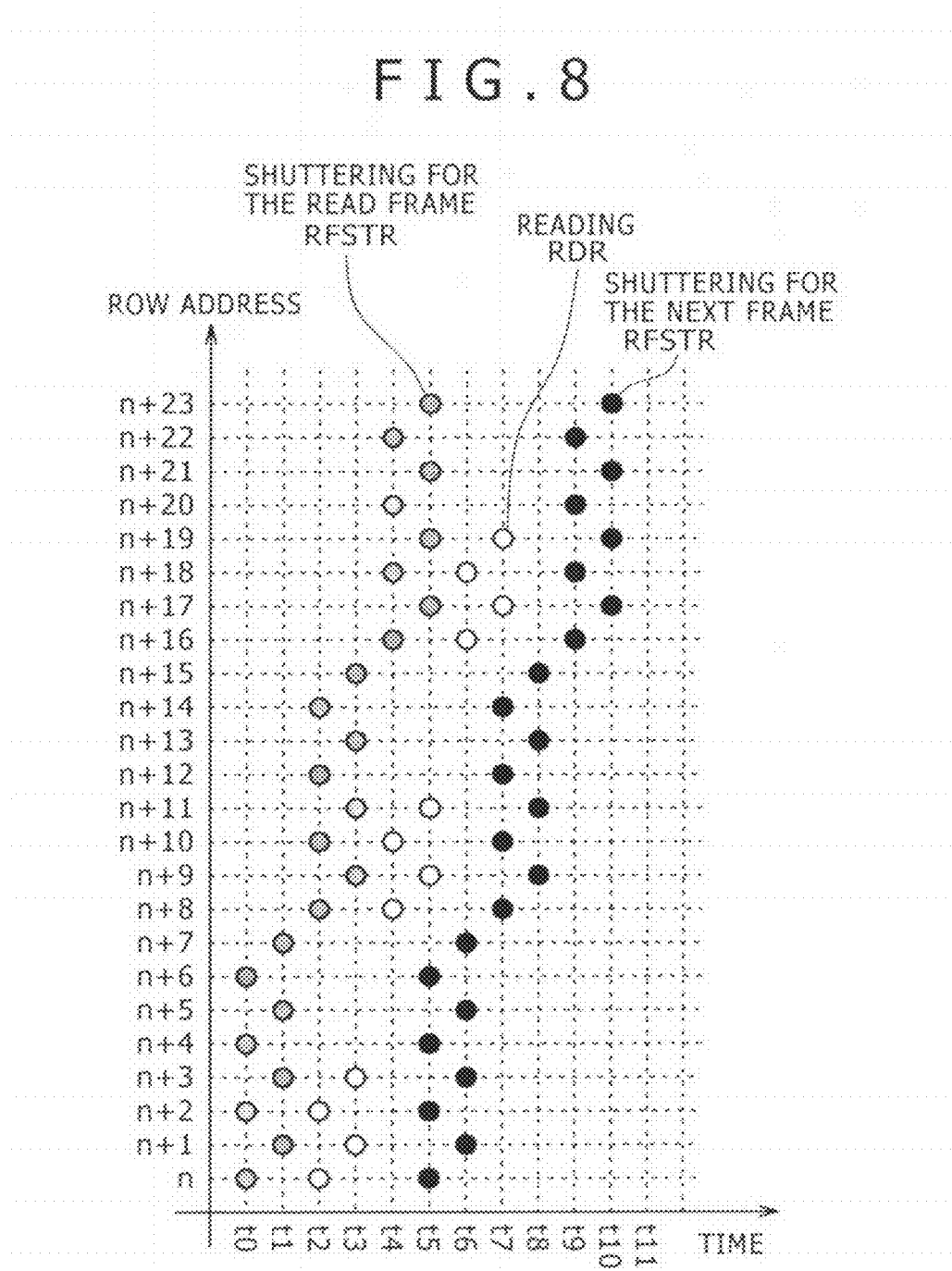
FIG. 8 is an explanatory diagram of pixel signal reading and shuttering according to the present embodiment.

FIG. 8 is an explanatory diagram of pixel signal reading and shuttering according to the present embodiment.

FIG. 8 shows "two-pixel addition" in which two pixels are added together and read at the same time.

Further, FIG. 8 shows "skipping half" adapted to skip half the pixels.

In FIG. 8, the horizontal axis represents the time, and the vertical axis the row addresses of the pixel array. The unit for the horizontal axis is the horizontal read period (H) that is the read time for a single row.

In FIG. 8, the read rows RDR are marked with an unfilled dot, shuttered rows NFSTR for a next frame with a filled dot, and shuttered rows RFSTR for a frame being read with a hatched dot. In each of these rows, the operations shown in FIG. 7 are performed.

At time t5, the row addresses "n+9" and "n+11" are selected as the read rows RDR at the same time, added together and read.

On the other hand, the row addresses "n+17," "n+19," "n+21," "n+23," "n," "n+2," "n+4" and "n+6" are shuttered.

The row addresses "n+17" and "n+19" are shuttered for the frame being read. The row addresses "n" and "n+2" are shuttered for the next frame.

The row addresses "n+21," "n+23," "n+4" and "n+6" are shuttered for anti-blooming purpose.

Figure 9:
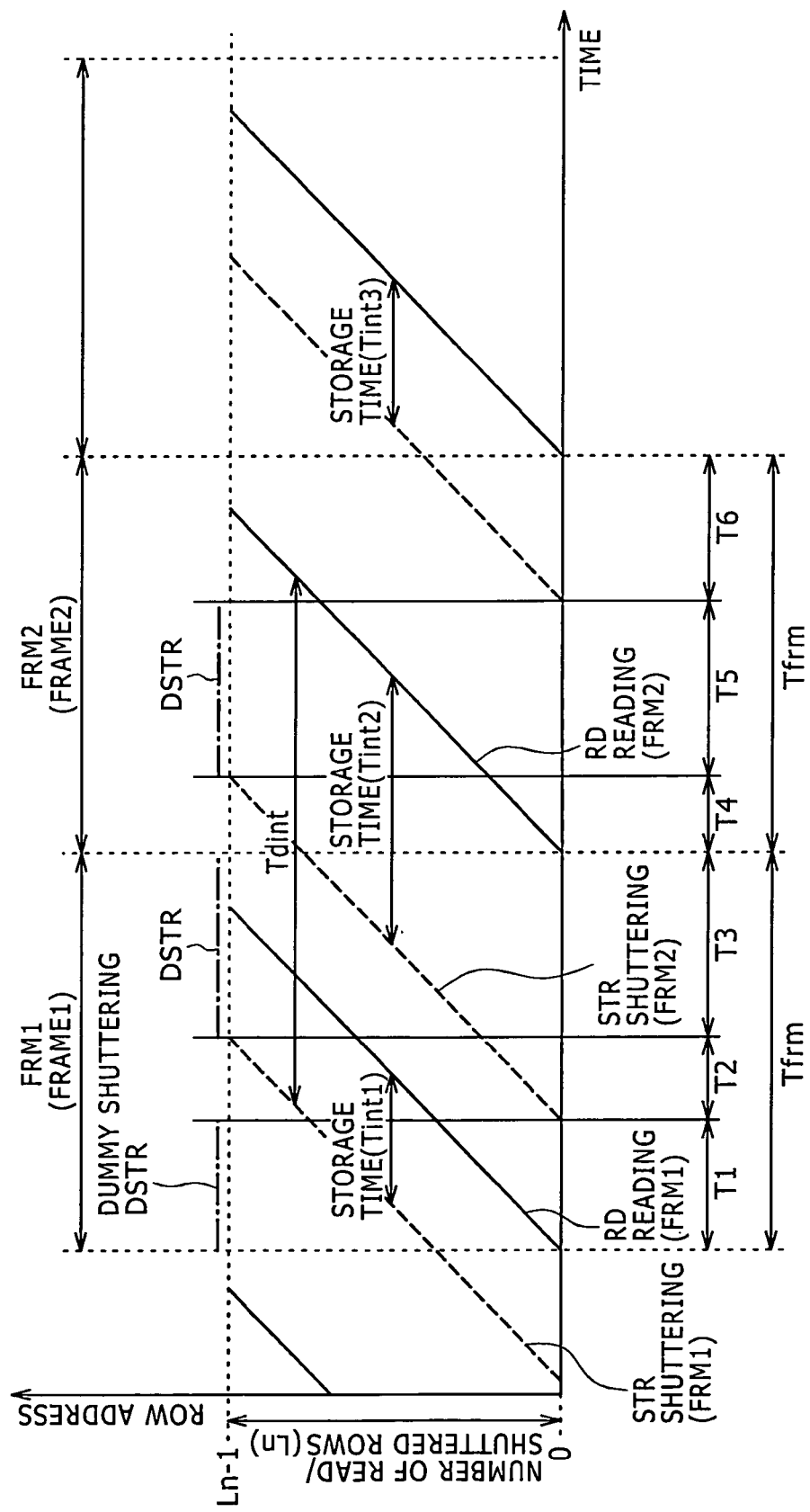
FIG. 9 is a diagram illustrating, for convenience, shuttering and reading according to the present embodiment.

FIG. 9 is a diagram illustrating, for convenience, shuttering and reading according to the present embodiment.

In FIG. 9, the vertical axis represents the row number, and the horizontal axis the time. The unit of time is the horizontal read period (H).

The row numbers represent the sequence in which the rows are accessed during a frame period.

A description will be given below of the row numbers by taking, as an example, a case in which "two-pixel addition" and "skipping half" are performed.

We assume that the reading begins from the row address "n."

At this time, for the read rows, the row number 0 is assigned to the row addresses "n" and "n+2," the row number 1 to the row addresses "n+1" and "n+3," and the row number 3 to the row addresses "n+8" and "n+10."

For the shuttered rows, the same row numbers as for the read rows should be assigned to the row addresses, except for the rows shuttered for anti-blooming purpose.

That is, when the row addresses "n," "n+2," "n+4" and "n+6" are accessed, we assume that the row number 0 is accessed.

Similarly, the row number 1 is assigned to the row addresses "n+1," "n+3," "n+5" and "n+7," and the row number 2 to the row addresses "n+8," "n+10," "n+12" and "n+14."

As described above, the row numbers are defined as representing the sequence in which the shuttered and read rows accessed.

In the CMOS image sensor 100 according to the present embodiment, the numbers of shuttered and read rows are constant for all row numbers.

For example, when "two-pixel addition" and "skipping half" are performed, the number of shuttered rows is always four, and the number of read rows is always two for all the row numbers.

In the example shown in FIG. 9, the storage time for a frame FRM1 is Tint1, that for a frame FRM2 Tint2, and that for a frame FRM3 Tint3 so that the storage time is different from one frame to another.

In the present embodiment, when the storage time is changed between frames, it is determined, based on the maximum number of shuttered rows in a frame, during which horizontal read period the dummy pixels are to be shuttered.

More specifically, when there is a horizontal read period in which the shuttering for the frame being read and that for the next frame are conducted at the same time during a given frame, the dummy pixels are shuttered so that as many rows as for two frames are shuttered at all times.

When there is no horizontal read period in which the shuttering for the frame being read and that for the next frame are not conducted at the same time during a given period, the dummy pixels are shuttered so that as many rows as for one frame are shuttered at all times.

In a period T2 during the frame FRM1, for example, the shuttering for frame being read or frame FRM1 and that for the next frame or frame FRM2 are conducted at the same time.

In contrast, only the shuttering for the frame FRM1 is conducted in a period T1, and only the shuttering for the frame FRM2 in a period T3.

Therefore, the shuttering is conducted in the largest number of rows in the period T2 for the frame FRM1. The number of rows shuttered in this period corresponds to that for two frames.

For this reason, the dummy pixels are shuttered so that as many rows as for two frames are shuttered at all times for the frame FRM1.

More specifically, as many dummy pixels as for one frame of shuttered rows are shuttered in the periods T1 and tT.

In contrast, as far as the frame FRM2 is concerned, the shuttering for the frame being read or frame FRM2 and that for the next frame or frame FRM3 are not conducted at the same time.

Only the shuttering for the frame FRM2 is conducted in a period T4, and only the shuttering for the frame FRM3 in a period T6. No shuttering is conducted in a period T5.

Therefore, as far as the frame FRM2 is concerned, as many rows as for one frame at most are shuttered. Therefore, the dummy pixels are shuttered so that as many rows as for one frame are shuttered at all times for the frame FRM2.

More specifically, as many dummy pixels are shuttered as for one frame of shuttered rows in the period T5.

It should be noted that, in the example shown in FIG. 9, the number of shuttered rows is constant throughout the frame. However, the number of shuttered rows need only be constant during a read period of the same frame.

So long as the reading is not conducted, the variation in source voltage resulting from the change in the number of shuttered rows has no adverse impact because no signals are read.

It is possible to determine whether the maximum number of shuttered rows in a frame is that for one or two frames by using the following equations:

Number of shuttered rows=One frame when $Ln \leq Td_{int}$

Number of shuttered rows=Two frames when $Ln > Td_{int}$ where Ln is the number of read/shuttered rows, and Tdint the interval between the read and next frames.

Tdint can be calculated from the one-frame period and the storage times of the read and next frames.

For example, Tdint for the frame FRM1 can be calculated by the following equation:

$$Tdint = Tfrm + Tint1 - Tint2$$

where Tfrm is the one-frame period, Tint1 the storage time of the frame FRM1, and Tint2 the storage time of the frame FRM2.

Driving the pixels as described above maintains the number of shuttered rows constant in a frame, thus preventing shutter level difference.

Further, the driving method according to the present embodiment requires only as many dummy pixels as for one frame of shuttered rows.

As described above, the present embodiment provides the following advantageous effect.

That is, only as many dummy pixels are provided as for one frame of shuttered rows in the present embodiment. This maintains the number of shuttered rows constant during reading in a frame, thus preventing shutter level difference.

This ensures that the number of required dummy pixels is smaller than the related art techniques, thus contributing to smaller chip size, reduced power consumption and lower chip unit price. The present embodiment is particularly effective when "addition" and "skipping" are conducted because the number of shuttered rows per frame is large.

Although not specifically limited, the CMOS image sensor according to the embodiment may be, for example, configured as a CMOS image sensor incorporating a column parallel analog/digital converter (hereinafter abbreviated as ADC).

The solid-state imaging element having the above-described advantageous effect is applicable as an imaging device of a digital camera or video camcorder.

2. Second Embodiment

Figure 10:
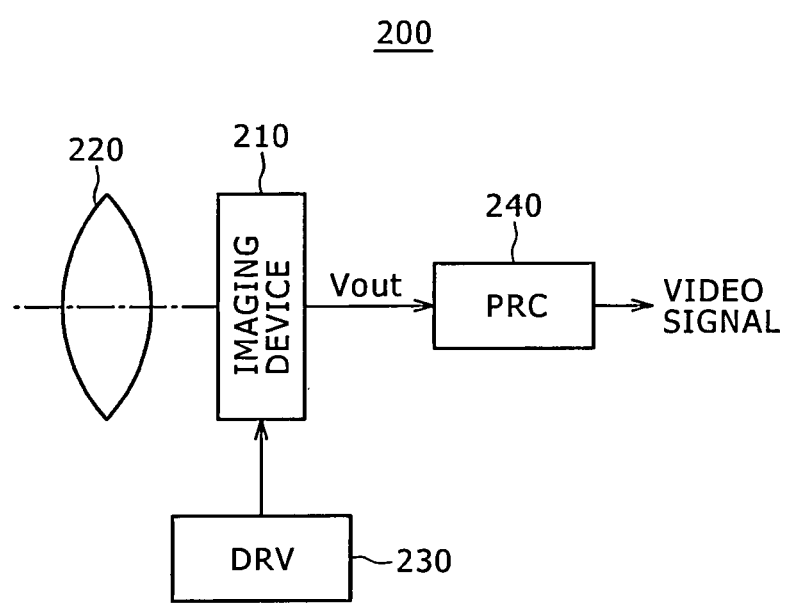
FIG. 10 is a diagram illustrating a configuration example of a camera system to which a solid-state imaging element according to a second embodiment is applied.

FIG. 10 is a diagram illustrating a configuration example of a camera system to which a solid-state imaging element according to a second embodiment is applied.

As illustrated in FIG. 10, a camera system 200 includes an imaging device 210 to which the CMOS image sensor (solid-state imaging element) 100 according to the present embodiment is applicable.

The camera system 200 further includes an optics adapted to guide incident light into the pixel region of the imaging device 210 such as a lens 220 adapted to form an image of incident light (image light) on the imaging surface.

The camera system 200 still further includes a driver (DRV) 230 and signal processor (PRC) 240. The driver 230 drives the imaging device 210. The signal processor 240 processes a signal output from the imaging device 210.

The driver 230 includes a timing generator (not shown) to drive the imaging device 210 with given timing signals. The timing generator generates a variety of timing signals including start and clock pulses adapted to drive the circuits incorporated in the imaging device 210.

On the other hand, the signal processor 240 performs given processing on the signal output from the imaging device 210.

The image signal processed by the signal processor 240 is recorded on a recording medium such as memory. The image information recorded on the recording medium is hard-copied, for example, by a printer. Further, the image signal processed by the signal processor 240 is displayed as a moving image on a monitor such as liquid crystal display.

As described above, when incorporated in an imaging apparatus such as digital still camera as the imaging device 210, the imaging element 100 provides a high-precision camera with low power consumption.

The present application contains subject matter related to that disclosed in Japanese Priority Patent Application JP 2009-252443 filed in the Japan Patent Office on Nov. 2, 2009, the entire content of which is hereby incorporated by reference.

It should be understood by those skilled in the art that a variety of modifications, combinations, sub-combinations and alterations may occur, depending on design requirements and other factors as far as they are within the scope of the appended claims or the equivalents thereof.

What is claimed is:

1. A solid-state imaging element comprising:
a pixel section having a plurality of pixels arranged in a matrix form, each of the pixels converting an optical signal into an electric signal and storing the electric signal according to exposure time;
a dummy pixel section having dummy pixels arranged in a matrix form; and
pixel drive sections adapted to control the pixel section in such a manner as to operate an electronic shutter on and read the pixel section and dummy pixel section, wherein
when an electronic rolling shutter is operated in which the pixels are shuttered row by row, the pixel drive sections judge whether the current and next frames are shuttered concurrently based on a maximum number of rows to be shuttered in a frame and in parallel so as to determine in which horizontal read period the dummy pixel section is to be shuttered.

2. The solid-state imaging element of claim 1, wherein
when the shuttering for the frame being read and that for the next frame are conducted concurrently and in parallel in a frame, the pixel drive sections shutter the dummy pixel section so that as many rows as for two frames are shuttered during the read period in a frame.

3. The solid-state imaging element of claim 1, wherein
when the shuttering for the frame being read and that for the next frame are not conducted concurrently and in parallel in a frame, the pixel drive sections shutter the dummy pixel section so that as many rows as for one frame are shuttered during the read period in a frame.

4. The solid-state imaging element of claim 1, wherein
when the shuttering for the frame being read and that for the next frame are conducted concurrently and in parallel in a frame, the pixel drive sections shutter the dummy pixel section so that as many rows as for two frames are shuttered during the read period in a frame, and
when the shuttering for the frame being read and that for the next frame are not conducted concurrently and in parallel in a frame, the pixel drive sections shutter the dummy pixel section so that as many rows as for one frame are shuttered during the read period in a frame.

5. The solid-state imaging element of claim 1, wherein
the dummy pixel section has as many rows as for one frame of shuttered rows.

6. The solid-state imaging element of claim 1, wherein
each of the pixels includes:
an output node;
a photoelectric conversion element adapted to convert an optical signal into an electric signal and store the electric signal;

a transfer element adapted to be turned on or off by a transfer signal and transfer the charge of the photoelectric conversion element to the output node when turned on; and a reset element adapted to be turned on or off by a reset signal and reset the output node when turned on.

7. A camera system comprising:

a solid-state imaging element; and an optics adapted to form a subject image on the solid-state imaging element; and a signal processor adapted to process an image signal output from the solid-state imaging element, the solid-state imaging element including a pixel section having a plurality of pixels arranged in a matrix form, each of the pixels converting an optical signal into an electric signal and storing the electric signal according to exposure time, a dummy pixel section having dummy pixels arranged in a matrix form, and pixel drive sections adapted to control the pixel section in such a manner as to operate an electronic shutter on and read the pixel section and dummy pixel section, wherein when an electronic rolling shutter is operated in which the pixels are shuttered row by row, the pixel drive sections judge whether the current and next frames are shuttered concurrently based on a maximum number of rows to be shuttered in a frame and in parallel so as to determine in which horizontal read period the dummy pixel section is to be shuttered.

8. The camera system of claim 7, wherein when the shuttering for the frame being read and that for the next frame are conducted concurrently and in parallel in a frame, the pixel drive sections shutter the dummy pixel section so that as many rows as for two frames are shuttered during the read period in a frame, and when the shuttering for the frame being read and that for the next frame are not conducted concurrently and in parallel in a frame, the pixel drive sections shutter the dummy pixel section so that as many rows as for one frame are shuttered during the read period in a frame.

9. The camera system of claim 7, wherein the dummy pixel section has as many rows as for one frame of shuttered rows.

\* \* \* \* \*